Oct. 26, 1926. 1,604,726
D. STAUTER
CUTTING APPARATUS WITH TRAILING CUT FOR MOWING MACHINES
Filed Dec. 30, 1924
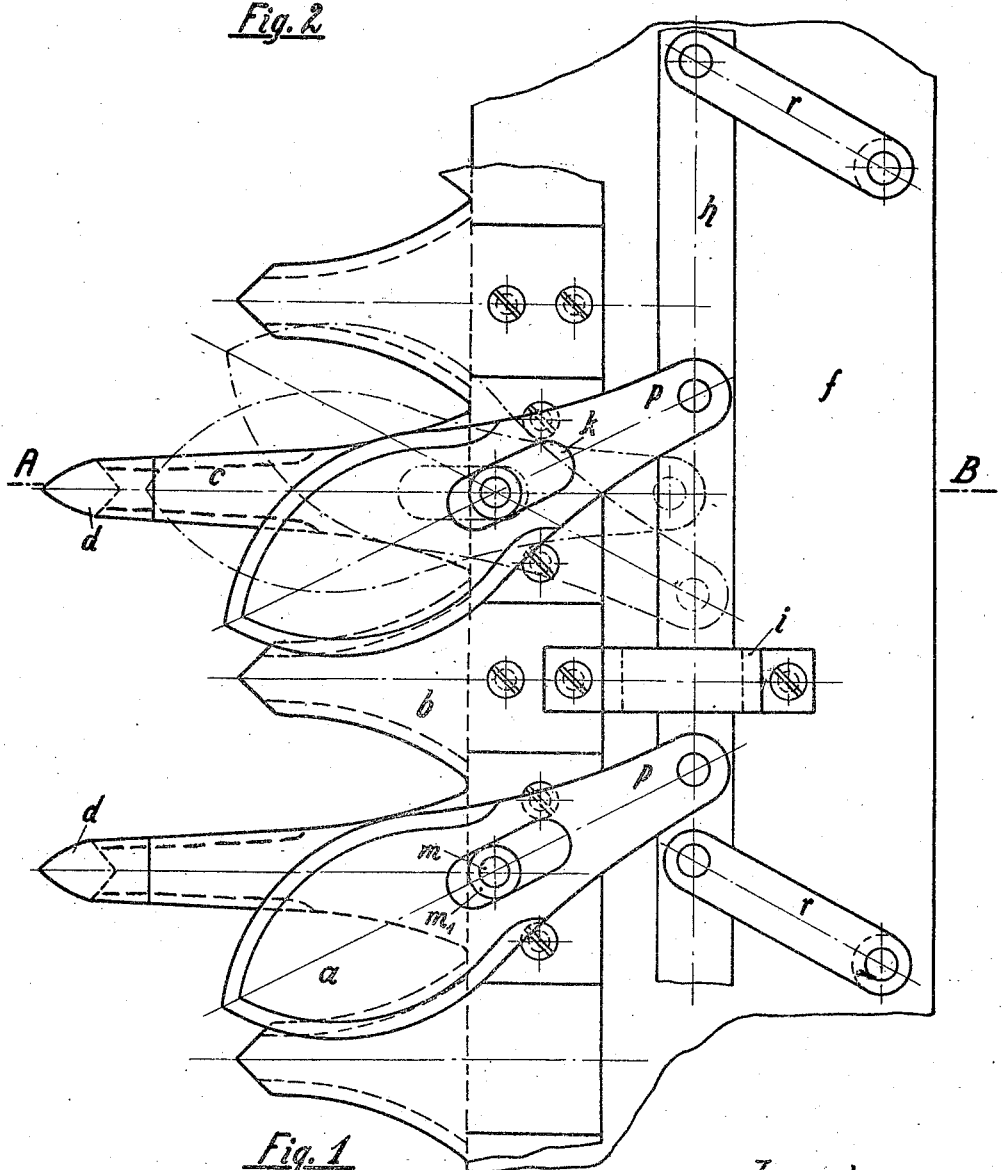
Inventor:
Daniel Stauter Patented Oct. 26, 1926.

1,604,726

UNITED STATES PATENT OFFICE.

DANIEL STAUTER, OF ZWEIBRUCKEN, GERMANY.

CUTTING APPARATUS WITH TRAILING CUT FOR MOWING MACHINES.

Application filed December 30, 1924, Serial No. 758,930, and in Germany June 17, 1924.

This invention relates to a cutting apparatus designed for mowing machines which is so constructed that it executes a long drawn cutting action and in which the leaf-shaped cutting knives oscillatable around guide studs, move to and fro between stationary rounded counter-cutting edges so that the stalks are successively cut when the knives are closing. A convenient number of knife blades are arranged on the cutter beam and a reciprocating movement is communicated to the same by a connecting rod. The construction of the frame of the mowing machine and of the driving gear is supposed to be known and will not be hereinafter described. The invention consists in mounting the knife levers with oblong guide slots on the pivot pins and in guiding the driving bar by means of links so that a forward and backward movement in longitudinal direction is communicated to the knives, besides the oscillating movement.

On the accompanying drawing the construction of the cutting apparatus is illustrated by way of example.

Fig. 1 shows the arrangement of one pair of knives on the cutter beam.

Fig. 2 is a section on line A—B of Fig. 1 showing also a cover plate and pressure bar.

The leaf-shaped knives $a$ oscillate each around a guide stud $m$ on which a roller $m'$ is mounted to protect the guide pin against wear. In order to obtain a long drawn cut the knives are guided by slots $k$ on their guide studs $m$ and behind the slots $k$ the knives form each a lever $p$ pivotally mounted on the bar $h$ by means of pins. A reciprocating movement is communicated to bar $h$ by means of links $r$ pivotally mounted on the cutter beam $f$. The counter knives $b$ and the finger-knives $c$ are fixed on the cutter beam $f$ in one and the same plane. The cutting edges of the knives $a$, $b$, $c$ are chamfered as usual. The knives $c$ are held at the front ends by means of a nose on the fingers $d$ which are fixed on the lower surface of the cutter beam by means of flaps $o$ (Fig. 2). The bar $h$ which is operated from the driving gear (not shown) through the intermediary of a crank rod is guided in clips $i$. A pressure bar $e$ which presses the knives $a$ on the knives $b$ and $c$ serves at the same time as holder and as stiffening for the cover plate $g$ (Fig. 2) which is fixed by means of hinges so that it can be lifted and lowered.

The cutting apparatus presents in comparison with the commonly used cutting apparatus the advantage that a considerable economy of power is obtained owing to the long drawn cut. Owing to the fact that the knives do not execute at one revolution of the crank shaft two comparatively short cuts as hitherto, but four the length of cut in forward direction becomes much longer, wherefrom results again a diminution of the number of revolutions and of the wear of the driving elements.

I claim:—

A cutting apparatus for mowing machines comprising in combination with the driving mechanism, a cutter beam, studs fixed on said cutter beam, a shifting bar movably mounted on said cutter beam, links fixed at one end on said cutter beam and at the other end on said shifting bar, leaf shaped movable knives pivotally mounted at the upper end on said shifting bar and having each an oblong slot engaging over one of said studs on the cutter beam, and twice as many stationary knives as movable knives fixed on said cutter beam underneath said movable knives and having each two cutting edges so that in mowing the cutting edges of each movable knife co-operate with four counter cutting edges.

In testimony whereof I affix my signature.

DANIEL STAUTER.